United States Patent
Misawa

(10) Patent No.: US 7,668,451 B2
(45) Date of Patent: Feb. 23, 2010

(54) SYSTEM FOR AND METHOD OF TAKING IMAGE

(75) Inventor: Atsushi Misawa, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 216 days.

(21) Appl. No.: 11/749,414

(22) Filed: May 16, 2007

(65) Prior Publication Data

US 2007/0269196 A1  Nov. 22, 2007

(30) Foreign Application Priority Data

May 16, 2006  (JP)  ............................... 2006-136149

(51) Int. Cl.
G03B 3/10 (2006.01)
G03B 13/34 (2006.01)
G03B 13/00 (2006.01)
H04N 5/232 (2006.01)

(52) U.S. Cl. ...................................... 396/121; 348/349
(58) Field of Classification Search ................. 396/111, 396/121; 348/349; 382/106
See application file for complete search history.

(56) References Cited

U.S. PATENT DOCUMENTS

| | | | | |
|---|---|---|---|---|
| 4,933,700 A | * | 6/1990 | Ikeda et al. | ................. 396/123 |
| 5,486,893 A | * | 1/1996 | Takagi | ......................... 396/147 |
| 6,614,998 B1 | * | 9/2003 | Senba et al. | ................. 396/123 |
| 2004/0207743 A1 | * | 10/2004 | Nozaki et al. | ........... 348/333.12 |
| 2005/0088538 A1 | * | 4/2005 | Nozaki et al. | ............. 348/229.1 |
| 2005/0248681 A1 | * | 11/2005 | Nozaki et al. | ................ 348/345 |
| 2006/0012690 A1 | * | 1/2006 | Nakamura et al. | ........ 348/231.6 |

FOREIGN PATENT DOCUMENTS

| | | |
|---|---|---|
| JP | 11-146405 A | 5/1999 |
| JP | 2004-320286 A | 11/2004 |
| JP | 2005-128156 A | 5/2005 |
| JP | 2005-352164 A | 12/2005 |
| JP | 2006-74498 A | 3/2006 |

* cited by examiner

*Primary Examiner*—W. B. Perkey
*Assistant Examiner*—Noam Reisner
(74) *Attorney, Agent, or Firm*—Sughrue Mion, PLLC

(57) ABSTRACT

An image taking method includes the steps of taking an image of an object to be taken, thereby generating image data. A predetermined objective body is detected from the image data. Exposure and/or focusing position are determined for each of the detected objective bodies. The image taking means is caused to take an image of each objective body according to the exposure and/or the focusing position determined for each of the detected objective bodies in response to one image-taking action.

7 Claims, 9 Drawing Sheets

| | DIAPHRAGM DATA | SHUTTER SPEED DATA | FOCUSING POSITION DATA |
|---|---|---|---|
| 1 | XXX | YYY | ZZZ |
| 2 | SSS | TTT | VVV |
| ... | ... | ... | ... |

SELECT IMAGE TO BE RECORDED

THIS IMAGE IS TO BE RECORDED?
YES / NO

FIG.10
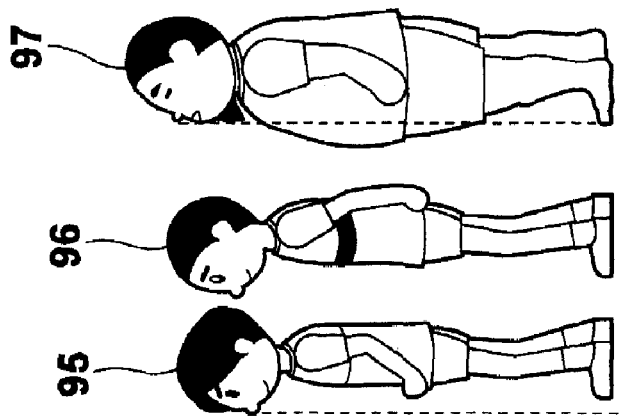
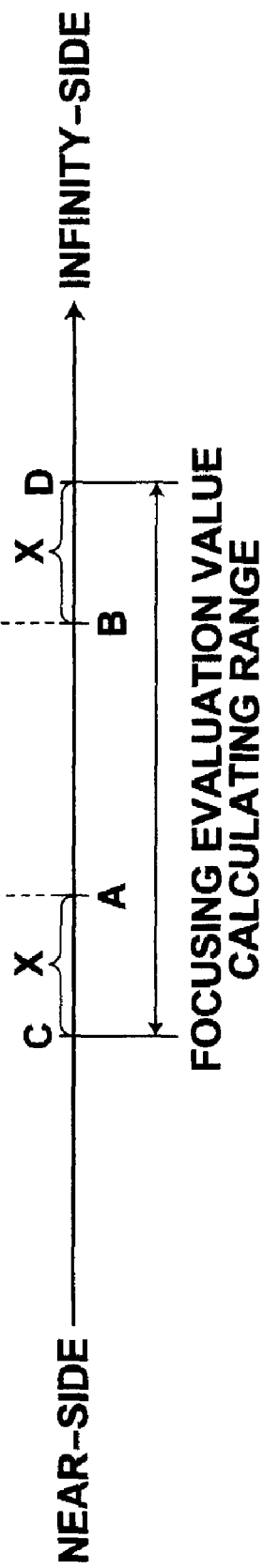

SYSTEM FOR AND METHOD OF TAKING IMAGE

BACKGROUND OF THE INVENTION

1. Field of the Invention

This invention relates to a system for taking an image such as a digital camera with an automatic exposure control system and an autofocus system, and a method of taking an image.

2. Description of the Related Art

Recently, there has been spread an image taking system such as a digital camera or a digital video camera which is provided with an automatic exposure control (AE) system and/or an autofocus (AF) system. As shown in Japanese Unexamined Patent Publication No. 11(1999)-146405, in the AE system and AF system, there has been known a technique where a position of the human is determined by detecting the skin color from obtained image data and the exposure conditions and/or the focusing position are determined.

However, in many image taking systems including those where the technique disclosed in Japanese Unexamined Patent Publication No. 11(1999)-146405 is employed, since the exposure control is carried out on only one of the humans and the focusing position are determined, when a plurality of humans to be photographed exist, the other humans can be out of focus and the image taken can deviate from intension of the user.

SUMMARY OF THE INVENTION

In view of the foregoing observations and description, the primary object of the present invention is to provide an image taking system and an image taking method which can obtain a desired image even if there are a plurality of object bodies to be taken.

An image taking system of the present invention comprises an image taking means which takes an image of an object to be taken and generates image data, an objective body detecting means which detects at least a predetermined objective body from the image data, an exposure determining means which determines exposure for each of the detected objective bodies, a focusing position determining means which determines a focusing position for each of the detected objective bodies, and an image-taking control means which causes the image taking means to take an image of each objective body according to the exposure and the focusing position determined for each of the detected objective bodies and stores image data of each objective body generated by the relevant image taking in a storage means in response to one image-taking action.

The storage means is for temporarily storing the image data, and may further comprise a display means which displays an image representing the image data temporarily stored in the storage means, an input means which inputs whether the displayed image is to be stored, and a storage means which stores only image data corresponding to the displayed image which is input as to be stored.

Further, when there are detected a plurality of predetermined objective bodies, the focusing position determining means may be that which calculates a focusing evaluation value for the range from a position nearer by a predetermined distance than the nearest predetermined objective body of the detected predetermined objective bodies to a position further by a predetermined distance than the furthest predetermined objective body of the detected predetermined objective bodies and determines the focusing position for each objective body.

The objective body may be the face or an eye of a human.

An image taking method of the present invention comprises the steps of taking an image of an object to be taken, thereby generating image data, detecting at least a predetermined objective body from the image data, determining exposure for each of the detected objective bodies, determining a focusing position for each of the detected objective bodies, and causing an image taking means to take an image of each objective body according to the exposure and the focusing position determined for each of the detected objective bodies in response to one image-taking action and storing image data of each objective body generated by the relevant image-taking in a storage means.

When there are a plurality of objects to be taken, the exposure or the focusing position has conventionally been determined solely on the basis of one of selected object, and accordingly, the exposure and/or the focusing position sometimes does not conform to the objects other than the selected object. However, in accordance with this invention, since the exposure or the focusing position is determined for each of the detected objective bodies, taking an image is carried out for each of the detected objective bodies under the exposure or the focusing position determined for the objective bodies, and the user can select, by the input means, the image to be stored out of the images which are obtained by taking an image for each of the detected objective bodies under the exposure or the focusing position determined for the objective bodies, the user can store a desired image. Specifically, for instance, when taking an image is to be carried out with a plurality objects in the angle of field, the user can store the image which is best in focus and exposure with respect to a particular object.

Further, when there are detected a plurality of predetermined objective bodies, by determining the focusing position by calculating a focusing evaluation value for the range from a position nearer by a predetermined distance than the nearest predetermined objective body of the detected predetermined objective bodies to a position further by a predetermined distance than the furthest predetermined objective body of the detected predetermined objective bodies and determining the focusing position for each objective body, the time required for determination of the focusing position can be shortened.

BRIEF DESCRIPTION OF THE DRAWINGS

FIG. 4 is a view showing data structure in the image-taking condition storage area in the first embodiment, FIG. 10 is a view for illustrating the focusing evaluation value calculating range.

DESCRIPTION OF THE PREFERRED EMBODIMENT

First Embodiment

Embodiments of the present invention will be described with reference to the drawings, hereinbelow. Though the following description is made mainly on the digital camera, the present invention may be applied to other various electronic instruments with an electronic imaging function such as a digital video camera, a mobile phone with a camera, or a PDA with a camera without limited to the digital camera.

Figure 1:
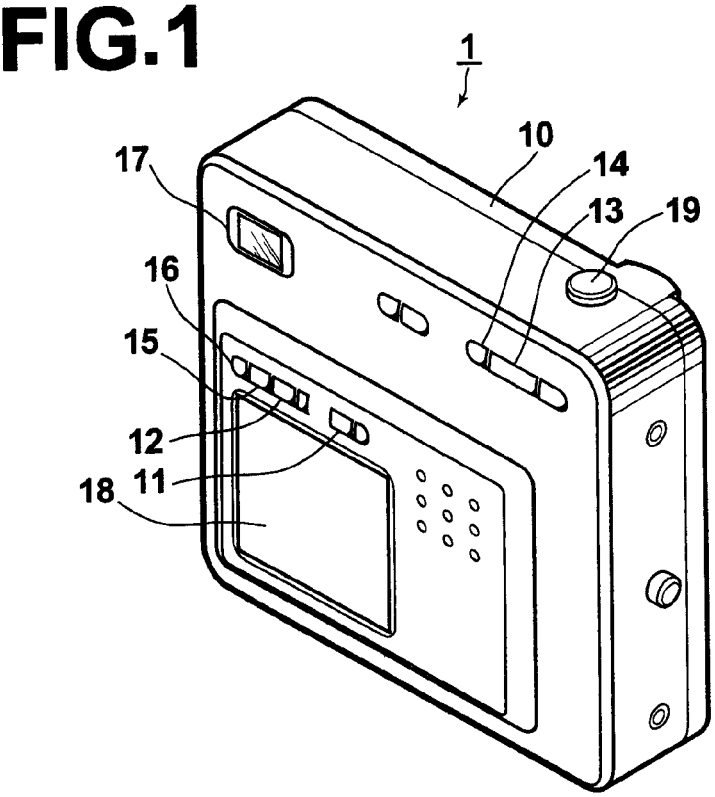
FIG. 1 is a perspective view showing a digital camera in accordance with a first embodiment of the present invention as viewed from rear.
Figure 2:
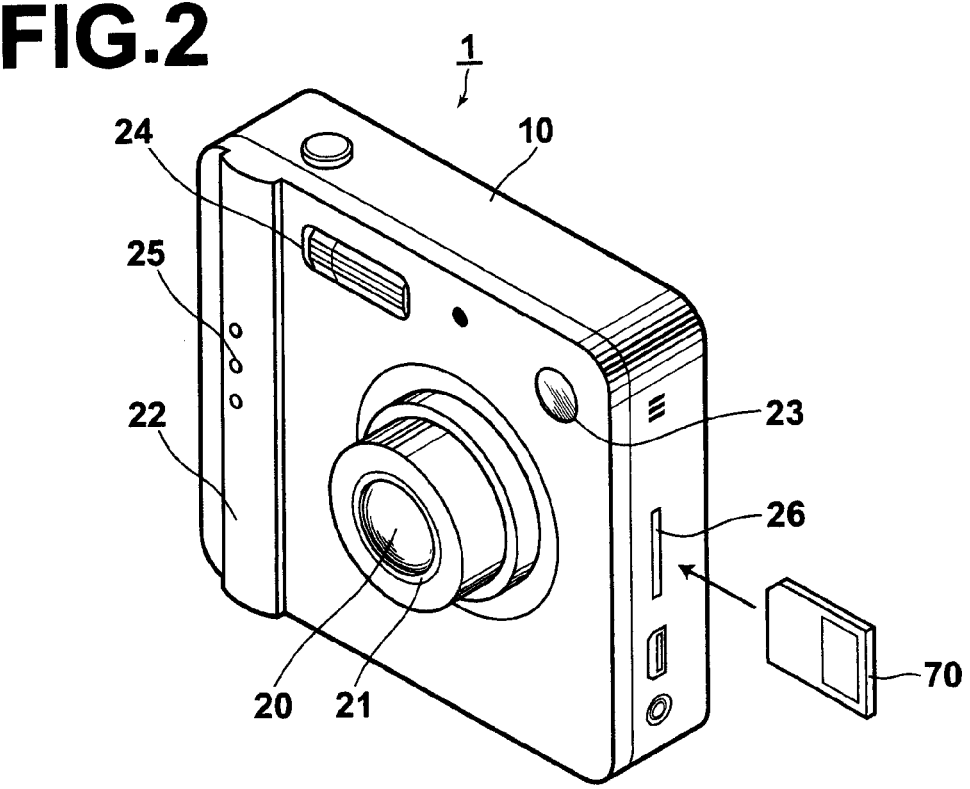
FIG. 2 is a perspective view showing the digital camera of the first embodiment as viewed from front.

FIGS. 1 and 2 show an example of the digital camera. As shown in FIG. 1, as an interface for control by the photographer, an action mode switch 11, a menu/OK button (input means) 12, a zoom/up and down lever 13, a right and left button 14, a back (return) button 15 and a display switching button 16 are provided on the rear surface of the body 10 of the digital camera 1. The rear surface of the body 10 of the digital camera 1 is further provided with a finder 17 for image taking, a monitor 18 for image taking and reproduction and a shutter release button 19.

The action mode switch 11 is a slide switch for switching the action modes between a still image taking mode, an animation taking mode and a reproduction mode. The menu/OK button (input means) 12 comprises a button for displaying on the monitor 18 various menus for setting an image taking mode, a strobe lighting mode, recording pixel number or sensitivities each time it is depressed, and for selection/setting on the basis of the menu displayed on the monitor 18.

When the zoom/up and down lever 13 is inclined up and down, tele/wide of the camera 1 is adjusted when an image is to be taken and the cursor displayed in the menu screen displayed on the monitor 18 is moved up and down when various values are set. The right and left button 14 is moved right and left in the menu screen displayed on the monitor 18 when various values are set.

When the back (return) button 15 is depressed, setting of the various values is interrupted, and the preceding screen is displayed on the monitor 18. The display switching button 16 is a button for switching ON and OFF of the display on the monitor 18, various guidance messages, ON and OFF of the character display when depressed. The finder 17 is for focusing the object and adjusting the composition when the user takes an image of the object. The image of the object viewed through the finder 17 is taken through a window 23 disposed on the front surface of the camera body 10.

The contents set by the control of the button or the lever can be recognized through the display on the monitor 18, the lamp in the finder 17, the position of the slide lever or the like. Further, a through image for confirming the object is displayed on the monitor 18 when taking an image. With this arrangement, the monitor 18 displays a still image and an animation after photographing and various values set in the menus as well as functions as an electronic viewfinder. When the shutter release button 19 is depressed, an image is taken on the basis of the exposure and the focusing position determined, and an image the same as that displayed on the monitor 18 is taken.

Further, as shown in FIG. 2, a taking lens 20, a lens cover 21, a power switch 22, the finder window 23, a strobe light 24 and a self-timer lamp 25 are provided on the front surface of the camera body 10 and a media slot 26 is provided on a side surface thereof.

The taking lens 20 is for imaging the object on a predetermined imaging surface (e.g., the surface of a CCD in the camera body 10) and comprises a focusing lens and a zoom lens. The lens cover 21 covers the surface of the taking lens 20, for instance, when the power source of the digital camera 1 is off or when the digital camera 1 is in the reproduction mode, to protect the taking lens 20 from stain, dirt and the like. The power switch 22 turns on and off the power source of the digital camera 1. The strobe light 24 momentarily irradiates the object with a necessary amount of light while the shutter release button 19 is depressed and the shutter in the camera body 10 is opened. The self-timer lamp 25 is for informing the object of the shutter open/close timing when an image is taken with the self-timer. The media slot 26 is a port in which an external recording medium 70 such as a memory card is packed, and when an external recording medium 70 is packed, data is read and written.

Figure 3:
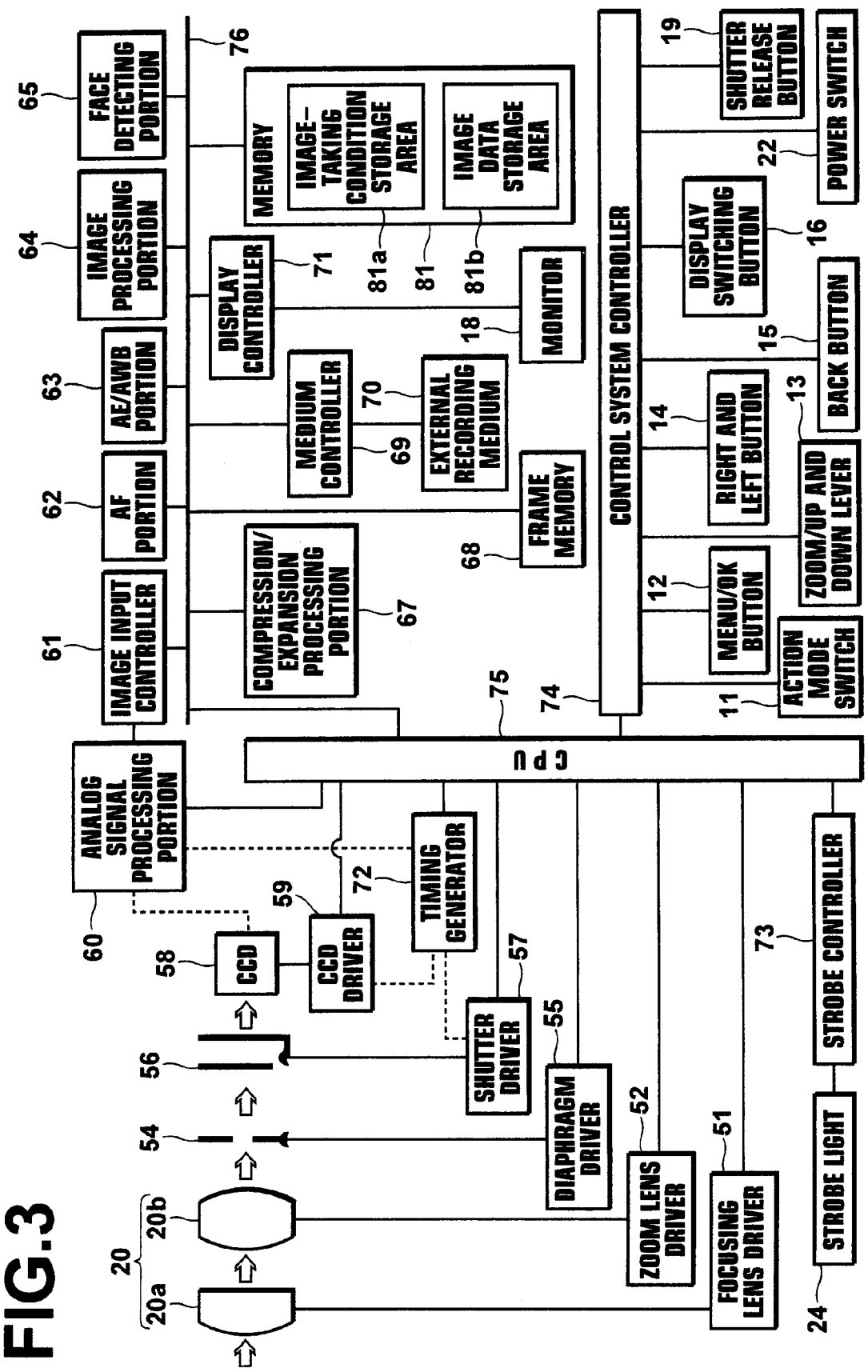
FIG. 3 is a block diagram showing functions of the digital camera of the first embodiment.

FIG. 3 is a block diagram showing functions of the digital camera 1. As the control system of the digital camera 1, there are provided the action mode switch 11, menu/OK button 12, zoom/up and down lever 13, right and left button 14, back (return) button 15, display switching button 16, shutter release button 19, power switch 22 and a control system control portion 74 which is an interface for transferring the contents of control of the elements described above to a CPU 75.

The taking lens 20 is formed of a focusing lens 20a and a zoom lens 20b. The lenses 20a and 20b are stepwise driven respectively by a focusing lens driver 51 and a zoom lens driver 52 comprising an electric motor and a motor driver to be moved in the direction of the optical axis. The focusing lens driver 51 stepwise drives the focusing lens 20a on the basis of focus driving amount data output from an AF portion 62. The zoom lens driver 51 stepwise drives the zoom lens 20b on the basis of data on the amount of control of the zoom/up and down lever 13.

A diaphragm 54 is driven by a diaphragm driver 55 comprising an electric motor and a motor driver. The diaphragm driver 55 adjusts the diameter of the diaphragm 54 on the basis of diaphragm data output from an AE (automatic exposure)/AWB (automatic white balance) portion (automatic exposure control portion) 63.

Shutter 56 is a mechanical shutter and is driven by a shutter driver 57 comprising an electric motor and a motor driver. The shutter driver 57 controls open/closure of the shutter 56 on the basis of a depression signal of the shutter release button 19 and shutter speed data output from the AE/AWB portion 63.

Behind the optical system described above, a CCD 58 which is an image-taking element is provided. The CCD 58 has a photoelectric surface comprising a lot of light receiving elements arranged in a matrix-like fashion, and an image of the object passing through the optical system is imaged on the photoelectric surface to be photoelectrically converted. Forward of the photoelectric surface, there are disposed a microlens array (not shown) for collecting light on each of the pixels and a color-filter array (not shown) comprising a lot of red filters, green filters and blue filters which are regularly arranged. The CCD 58 reads out line by line electric charges accumulated by the pixels and outputs them as an image signal in synchronization with vertical and horizontal clock signals supplied from a CCD control portion 59. The electric charge accumulating time of each pixel, that is, the exposure time, is determined by an electronic shutter-drive signal given by the CCD control portion 59. The image signal output by the CCD 58 is input into an analog signal processing portion 60. The analog signal processing portion 60 comprises a correlation double sampling circuit (CDS) for removing noise of the image signal, an auto-gain controller (AGC) for adjusting the gain of the image signal and an A/D converter (ADC) for converting the image signal to a digital image data. The digital image data is a CCD-RAW data having RGB density values by each of the pixels.

A timing generator 72 generates timing signals, and the timing signals are input into the shutter driver 57, the CCD control portion 59 and the analog signal processing portion 60 to synchronize operation of the shutter button 19, open and closure of the shutter 56 and processing of the analog signals. A strobe control portion 73 controls light emitting action of the strobe light 24.

An image input controller 61 writes, in a frame memory 68, the CCD-RAW data input from the analog signal processing portion 60. The frame memory 68 is a working memory for use when each of various digital image processing (signal processing) to be described later is to be carried out on the image data, and comprises an SDRAM (synchronous dynamic random access memory) which transfers data in synchronization with bus clock signals of a constant period.

A display control portion 71 is for displaying, on the monitor 18, image data stored in the frame memory 68 as a through image, and integrates a luminance signal (Y signal) and a color signal (C signal) into one composite signal to output it to the monitor 18. The through images are obtained at predetermined intervals and are displayed on the monitor 18 while the image taking mode is selected. The display control portion 71 displays, on the monitor 18, an image based on image data included in an image file which is stored in an external recording medium 70 and read out therefrom by a medium control portion 69.

The AF portion (focusing position determining means) 62 determines the focusing position according to result of detection or an image measurement of the face or the eye of the human detected from image data by a face detecting portion (object body detecting means) 65 to be described later. Specifically, the focusing position may be determined by measuring the distance to the detected face by the use of, for instance, a distance sensor (not shown) and determining the focusing position on the basis of result of detection or by calculating the distance to the detected face from the size of the face or the space between the eyes without using the distance sensor and determining the focusing position on the basis of result of calculation. These methods are generally used as an active system. Otherwise, the focusing position may be determined by stepwise moving the focusing lens 20a in its operating range, calculating a focusing evaluation value each time the focusing lens is moved, and determining the focusing position on the basis of the position corresponding to a peak value corresponding to the detected face out of the peak values of the focusing evaluation values (contrast detection method). Further, the AF portion 62 determines the focusing position by detected faces, and stores them in an image-taking condition storage area 81a of a memory 81.

The AE/AWB portion 63 determines exposure such as diaphragm data and/or shutter speed data from the result of detection of the face or eye of the human detected from image data by the face detecting portion 65 and adjusts white balance. The AE/AWB portion 63 determines diaphragm data and shutter speed data by the detected faces and stores them in the image-taking condition storage areas 81a of the memory 81.

The face detecting portion 65 is for detecting the face or eye of the human from the image data stored in the frame memory 68. Though the face detecting portion 65 will be described as detecting the face of the human, the face detecting portion 65 may detect the eye of the human. Further, the face detecting portion 65 may detect the face or eye of the animal.

An image processing portion 64 carries out image corrections such as a γ-correction, a sharpness correction and a contrast correction on the image data of this main image, and carries out YC processing where the CCD-RAW data is converted to YC data comprising Y data which is a luminance signal, Cb data which is a blue difference signal and Cr data which is a red difference signal. "This main image" is an image based on image data which is stored in the frame memory 68 by way of the analog signal processing portion 60 and the image input controller 61 after an image signal is output from the CCD 58 in response to depression of the shutter release button 19. Though the upper limit of the number of pixels of "main image" is governed by the number of pixels of the CCD 58, the number of pixels used in the recording can be changed, for instance, by the user's setting an image quality (fine, normal and the like). On the other hand, the number of pixels of the through image and/or a pre-image may be smaller than that of the main image, for instance, about 1/16 thereof.

A compression/expansion processing portion 67 compresses, for instance, in JPEG format, image data which has been processed with an image quality correction or the like by the image processing portion 64 and generates an image file. To this image file, information is attached on the basis of various data formats. This compression/expansion processing portion 67, in a reproduction mode, reads out the compressed image file from the external recording medium 70 and expands it. Expanded image data is output to the display control portion 71, and the display control portion 71 displays an image on the monitor 18 on the basis of the image data.

A medium control portion 69 corresponds to the media slot 26 in FIG. 2. The medium control portion 69 reads out the image file and the like stored in the external recording medium 70 and writes an image file therein.

The memory 81 is a readable and writable storage means for storing various data related to the image taking. The memory 81 comprises the image-taking condition storage area 81a and an image data storage area (memory means, storage means) 81b. FIG. 4 shows an example of data structure in the image-taking condition storage area 81a. In the image-taking condition storage area 81a, there are stored diaphragm data, shutter speed data, focusing position data and the like determined in the AF portion 62 and the AE/AWB portion 63, by the detected faces. When there is detected no face, focusing position data, diaphragm data and shutter speed data are determined on the basis of predetermined AE area and AF area, and stored linked with each other. In the image data storage area 81b, there are stored image data of an image taken on the basis of focusing position data, diaphragm data and shutter speed data stored in the image-taking condition storage area 81a.

A CPU (image-taking control means) 75 controls each element of the digital camera 1 according to operation of the various buttons, levers and the switches and/or signals from the various function blocks. A data bus 76 is connected to the image input controller 61, each of the processing portions 62 to 67, the frame memory 68, each of the control portions 69 to 71, the memory 81 and the CPU 75, and each of the signals and the pieces of data is transmitted and received by way of the data bus 76.

Figure 5:
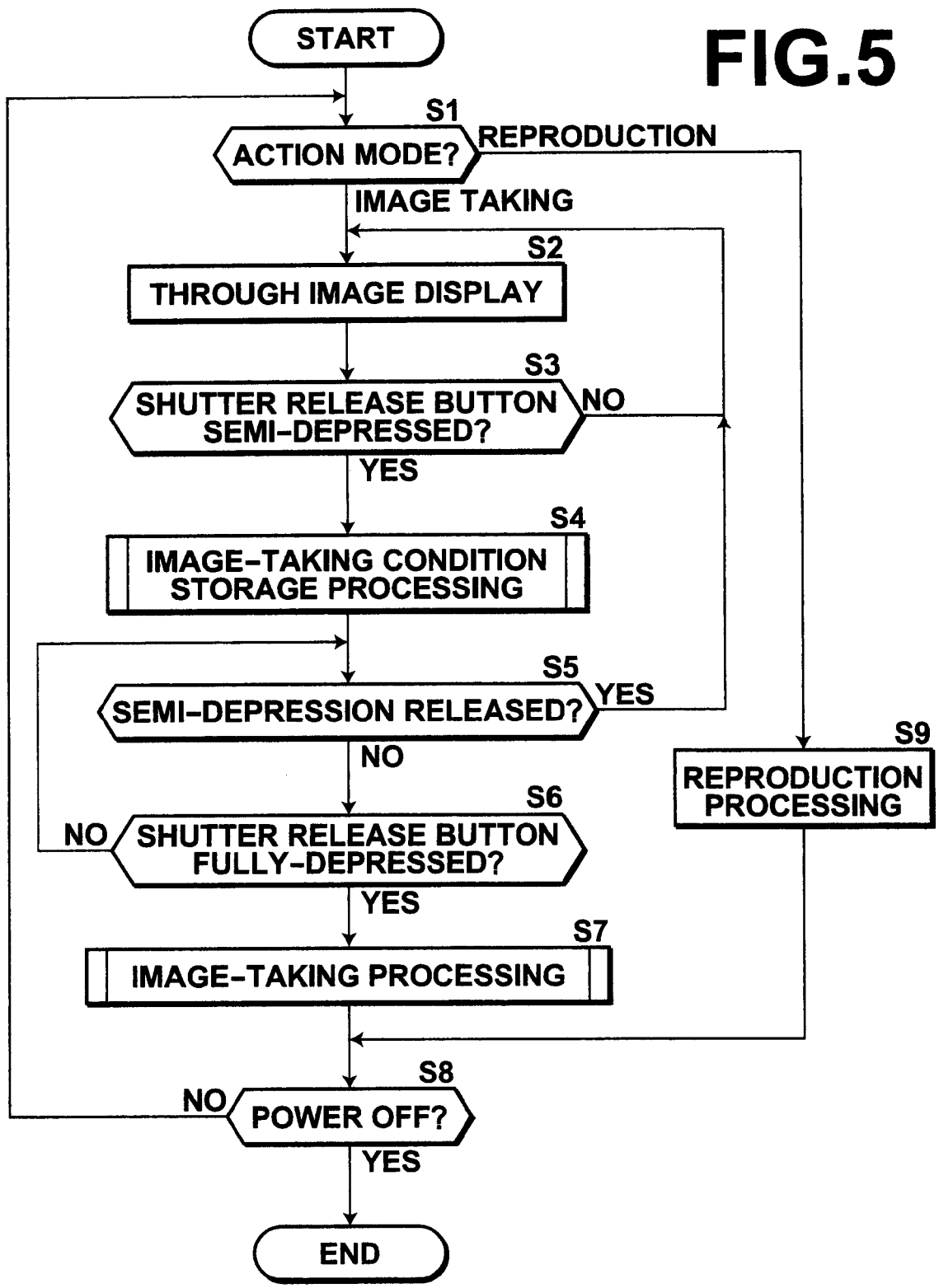
FIG. 5 is a view showing a flowchart for illustrating an operation of the digital camera of the first embodiment.

An operation of the digital camera 1 will be described in brief with reference to the flowchart shown in FIG. 5, hereinbelow. The CPU 75 first determines whether the working mode is the image-taking mode or the reproduction mode according to the setting by the action mode switch. (step S1)

When it is determined that the working mode is the reproduction mode, the reproduction is carried out. (step S9) In the reproduction, the medium control portion 69 reads out the image file which has been stored in the external recording medium 70 and displays an image on the monitor 18 on the basis of image data included in the image file. When the reproduction is ended, the CPU 75 determines whether the off-operation has been effected by way of the power switch 22 of the digital camera 1. (step S8) When it is determined that the off-operation has been effected, the power source of the digital camera 1 is turned off and the processing is ended.

On the other hand, when it is determined in step S1 that the working mode is the image-taking mode, the CPU 75 controls display of the through image. (step S2) The "display of the through image" means to display aforesaid pre-images on the monitor 18. Then the CPU 75 determines whether the shutter release button 19 has been semi-depressed. (step S3) When it is determined that the shutter release button 19 has not been semi-depressed, the CPU 75 repeats the processing of step S2. When it is determined that the shutter release button 19 has been semi-depressed, the CPU 75 proceeds to an image-taking condition setting processing in step S4. The image-taking condition setting processing will be described in detail later.

After the image-taking condition setting processing, it is determined whether the semi-depression of the shutter release button 19 has been released. (step S5) When it is determined that the semi-depression of the shutter release button 19 has been released, the CPU 75 proceeds to step S2. When it is determined that the semi-depression of the shutter release button 19 has not been released, the CPU 75 determines whether the shutter release button 19 has been fully depressed. (step S6) When it is determined that the shutter release button 19 has not been fully depressed, the CPU 75 proceeds to step S5. When it is determined that the shutter release button 19 has been fully depressed, the CPU 75 executes an image-taking in step S7. The image-taking will be described in detail later.

When the image-taking is ended, the CPU 75 determines whether the off-operation has been effected by way of the power switch 22. (step S8) When it is determined that the off-operation has been effected, the power source of the digital camera 1 is turned off and the processing is ended. When it is determined that the off-operation has not been effected, the CPU 75 proceeds to step S1.

Figure 6:
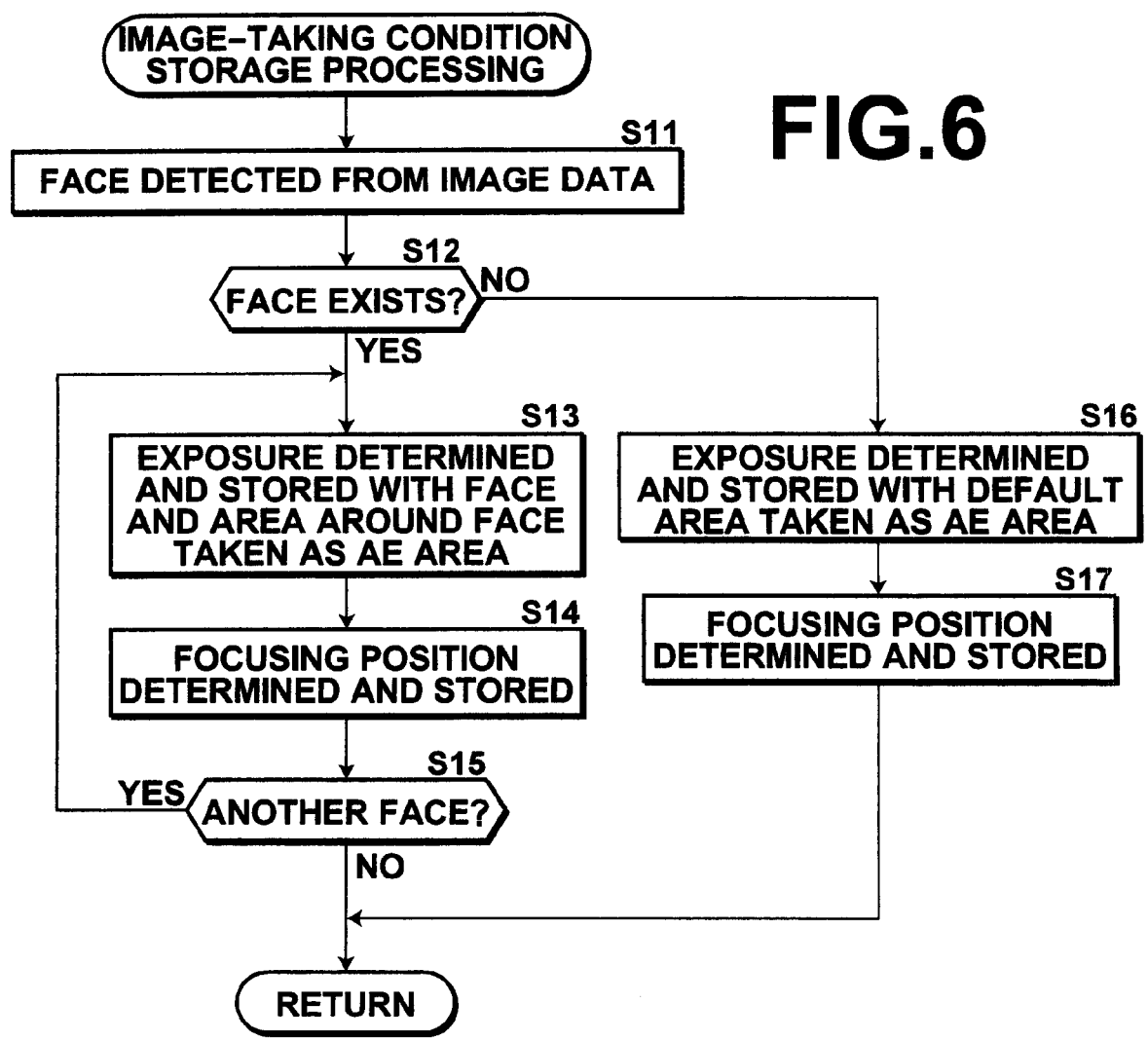
FIG. 6 is a view showing a flowchart for illustrating the image-taking condition setting process in the first embodiment.

FIG. 6 is a flowchart showing the flow of the image-taking condition setting processing. The face detecting portion 65 first detects faces on the basis of image data output from the CCD 58. (step S11) When the face is detected (step S12; YES), the AE/AWB portion 63 determines the exposure condition such as the diaphragm data, the shutter speed and the like with the detected face and the area therearound taken as the AE area, and stores them in the image-taking condition storage area 81a of the memory 81 linked with the detected face. (step S13) Then the AF portion 62 determines the focusing position for the detected face and, similarly stores it in the image-taking condition storage area 81a of the memory 81 linked with the detected face. (step S14)

The focusing position may be determined on the basis of the result of measurement by measuring the distance to the detected face by the use of the distance sensor or the like. Further, the focusing position may be determined on the basis of the distance to the detected face by calculating the distance to the detected face from the size of the face and/or the space between the eyes without using the distance sensor. Otherwise, the focusing position may be determined by stepwise moving the focusing lens 20a in its operating range, calculating a focusing evaluation value each time the focusing lens is moved, and determining the focusing position on the basis of the position corresponding to a peak value corresponding to the detected face out of the peak values of the focusing evaluation values.

When there is another detected face, the CPU 75 proceeds to step S13 and when there is no another detected face, the CPU 75 ends the image-taking condition setting processing. When no face is detected (step S12; NO), the AE/AWB portion 63 determines the exposure condition with a predetermined area taken as the AE area, and stores them in the image-taking condition storage area 81a. (step S16) Further, the AE/AWB portion 63 determines and stores the focusing position (step S17) and then ends the processing.

Figure 7:
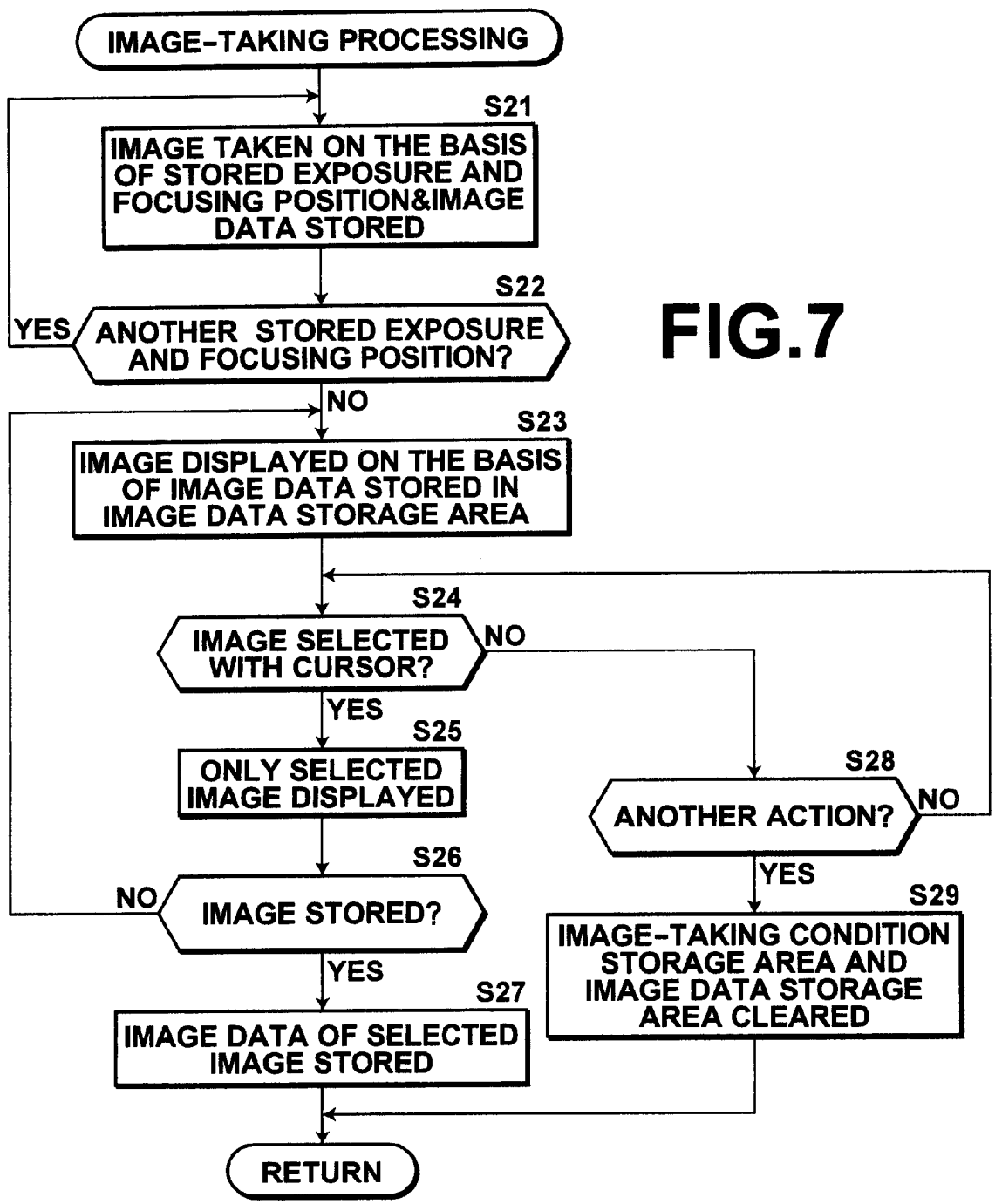
FIG. 7 is a view showing a flowchart for illustrating the image taking process in the first embodiment.

The flow of the image-taking processing shown in FIG. 7 will be described, hereinbelow. The CPU 75 first reads out from the image-taking condition storage area 81a the diaphragm data, shutter speed data and the focusing position stored linked with each other, and outputs the data to the focusing lens driver 51, the diaphragm driver 55 and the shutter driver 57, thereby opening and closing the shutter 56 to carry out the image-taking and storing the obtained image data in the image data storage area 81b. (step S21)

Figure 8A:
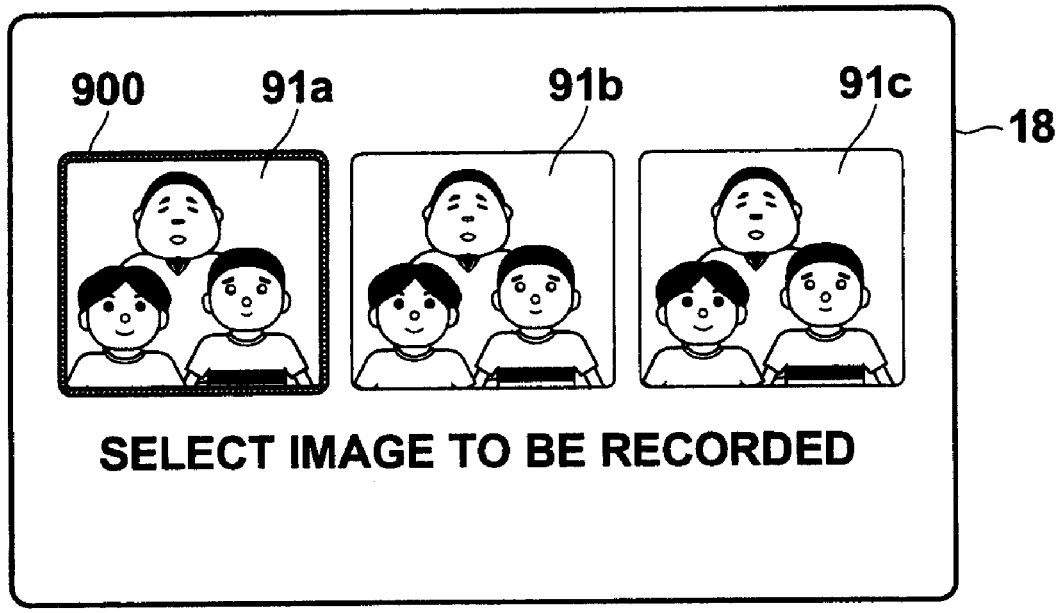
FIGS. 8A and 8B are views showing displaying examples of the monitor in the first embodiment.

When there is another series of image-taking conditions and the focusing position (step S22; YES), the CPU 75 repeats step S21. Otherwise (step S22; NO), the CPU 75 outputs to the display control portion 71 an instruction signal which instructs to display an image on the monitor 18 on the basis of image data stored in the image data storage area 81b. (step S23) FIG. 8A is an example of display on the monitor 18 at this time. For example, when three sets of the focusing positions, diaphragm value data and the shutter speed data are stored in the image-taking condition storage means 81a, image data for three images is stored in the image data storage means 81b by repeating three times the processing in step S21 according to each of the focusing positions and each of exposure conditions, and three images 91a to 91c are displayed on the monitor 18 on the basis of the image data obtained by three times image-taking. Though the three images 91a to 91c are the same for the purpose of convenience, the three images 91a to 91c are actually finely different from each other in exposure and/or focusing position since the image-taking conditions are different.

A cursor frame 900 is displayed around one of the three images 91a to 91c displayed on the monitor 18. After controlling the right and left button 14 to move the cursor frame 900 to the image to be stored, the user depresses the menu/OK button 12. For example, if the menu/OK button 12 is depressed when the cursor frame 900 is on the image 91a (step S24; YES), the CPU 75 outputs to the display control portion 71 an instruction signal which instructs to display only a selected image on the monitor 18. (step S25) Then a message for permitting the user to select whether the selected image 91a is to be selected is displayed in the monitor 18. If the menu/OK button 12 is depressed when the cursor 92 is in the YES position (step S26; YES), the CPU 75 registers the image data corresponding to the image 91a as data to be stored, and deletes the image data corresponding to the images 91b and 91c. (step S27) Or the menu/OK button 12 may read out the image data corresponding to the image 91a from the image data storage area 81b and may record the same on the external recording medium 70 by way of the medium control portion 69.

Figure 8B:
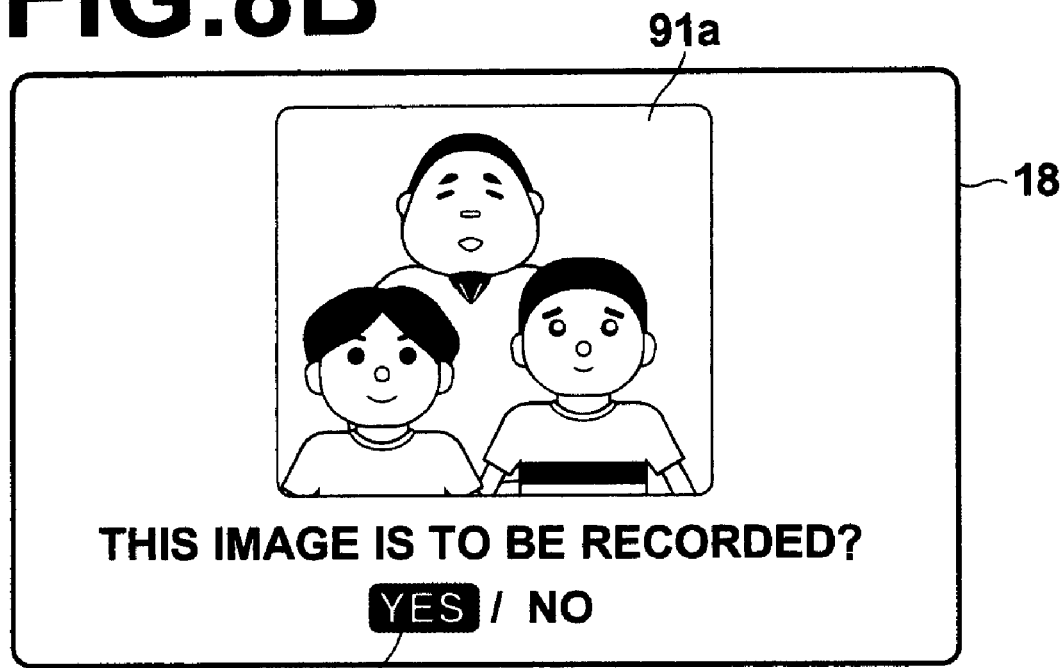

On the other hand, if a button other than the right and left button 14 and the menu/OK button 12 is depressed in step S24 (when images as shown in FIG. 8A are displayed on the monitor 18) (step S24; NO, step S28; YES), the CPU 75 clears (deletes) the contents of the image-taking condition storage area 81a and the image data storage area 81b (step S29) and ends the image-taking processing. When the menu/OK button 12 is depressed in step S26 (when images as shown in FIG. 8B are displayed on the monitor 18) (step S26; NO) with a cursor 92 in the position of NO, the CPU 75 shifts to step S23.

By determining a focusing point and image-taking conditions for each of the detected faces, taking images by the detected faces according to the focusing point and the image-taking conditions determined and permitting the user to select the image to be stored viewing the images represented by a plurality of pieces of image data obtained by the image-taking, the user can store and record a desired image. Specifically, for instance, when taking an image with a plurality of objective bodies in the angle of field, the user can select and store the image which is best in focus and exposure with respect to a particular object.

Second Embodiment

In the image-taking condition setting processing in the first embodiment, the focusing position with respect to the detected face may be determined, for instance, according to the distance to the detected face, by calculating the distance to the detected face on the basis of the size of the face and/or the distance between the eyes, or by stepwise moving the focusing lens 20a in its operating range, calculating a focusing evaluation value each time the focusing lens is moved, and determining the focusing position on the basis of the position corresponding to a peak value corresponding to the detected face. In the image taking system in accordance with a second embodiment, the image-taking conditions are concretely shown in conjunction with how to determine the focusing position. Since the image-taking system of the second embodiment is the same as that of the first embodiment in the appearance of the digital camera 1, the function block diagram, the data structure in the image-taking condition storage area 81a, the flowchart for describing a series of action of the digital camera 1, the flowchart for describing the flow of the image-taking processing, and the example of the display on the monitor 18, the description is abbreviated.

Figure 9:
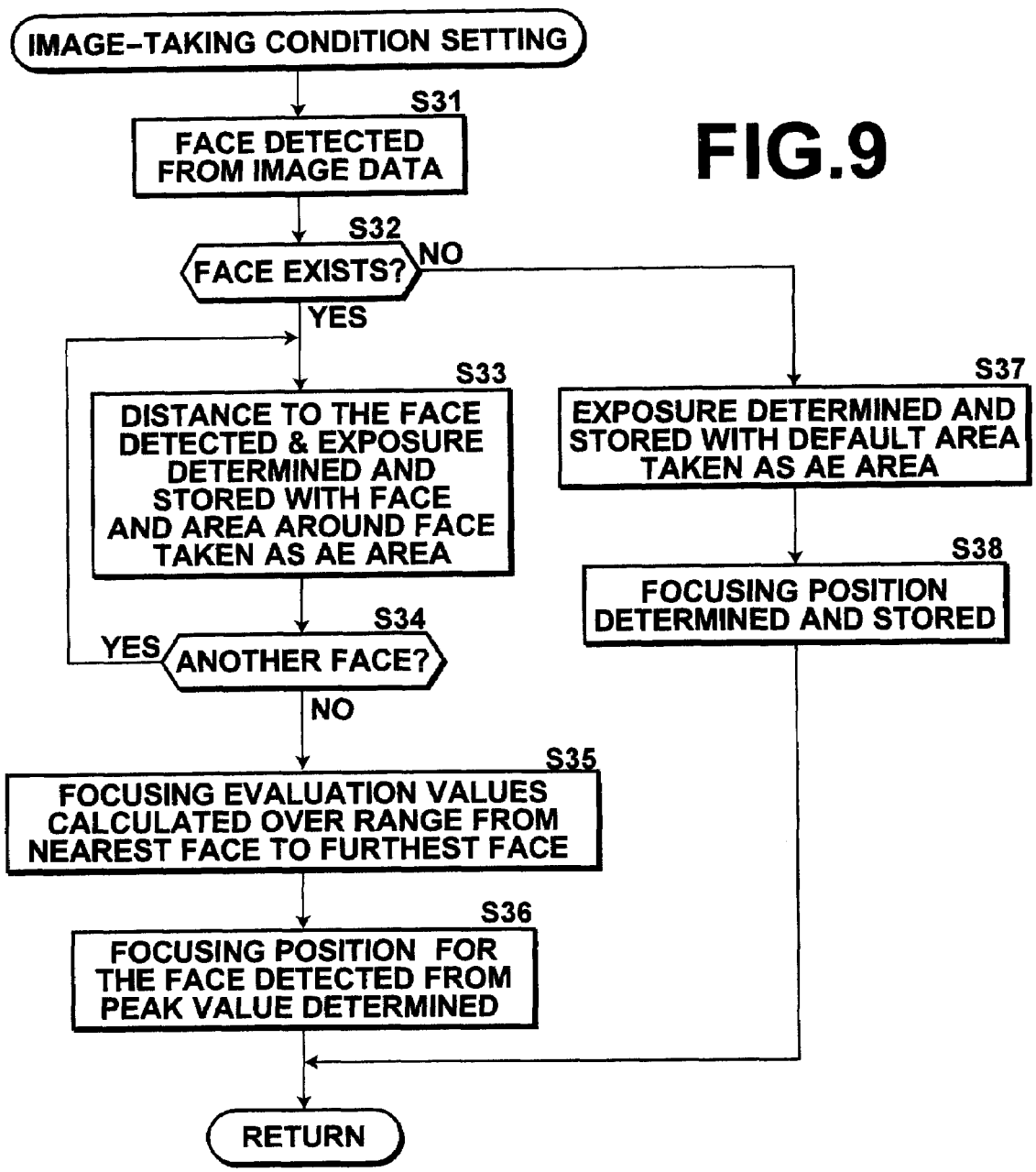
FIG. 9 is a view showing a flowchart for illustrating the image-taking condition setting process in the second embodiment.

FIG. 9 shows a flowchart showing the flow of the image-taking condition setting processing in the second embodiment. First the face detecting portion 65 detects the face of the human from the image data output from the CCD 58. (step S31) When the face is detected (step S32; YES), the distance to the face is detected. The distance to the face may be detected by the use of a distance sensor or by calculating from the size of the face or the space between the eyes. The AE/AWB portion 63 determines the exposure condition such as the diaphragm data, the shutter speed and the like with the detected face and the area therearound taken as the AE area, and stores them in the image-taking condition storage area 81a of the memory 81 linked with the detected face. (step S33)

When there is another detected face (step S34; YES), the CPU 75 proceeds to step S33 and when no face is detected (step S34; NO), the AF portion 62 calculates a focusing evaluation value stepwise moving the focusing lens 20a over a range from a position nearer by a predetermined distance than the face nearest in the detected face to a position further by a predetermined distance than the face furthest in the detected faces (step S35) and determines the focusing position for each face by causing the peak value of the calculated focusing evaluation values to correspond to the position of each of the faces. (step S36)

FIG. 10 is a view showing the positions of the faces and the focusing evaluation value calculating range. For example, when image taking is carried out with humans 95, 96 and 97 employed as objective bodies, the AF portion 62 calculates focusing evaluation values over a range from a position C nearer by a predetermined distance x than a position A of the nearest human 95 to a position D further by a predetermined distance x than the furthest human 97. That is; the AF portion 62 calculates the focusing evaluation values over a range from the position C to the position D.

Generally, it is often the case that the focusing evaluation values are calculated over a range from the nearest position to the infinity. However, the time required to determine the focusing position is shortened by thus calculating the focusing evaluation values only over a range where the face is detected. Further, since the step driving of the focusing lens is minimized, the power consumption required to determine the focusing position is suppressed.

On the other hand, when no face is detected (step S32; NO), the AE/AWB portion 63 determines the image-taking conditions by setting the AE area to a predetermined area and stores them in the image-taking condition storage area 81a. (step S37) Further, the focusing position is determined and stored. (step S38) Then the image-taking condition setting processing is ended.

Thus, by calculating the focusing evaluation values only over a range where the face is detected, the time required to determine the focusing position is shortened and at the same time, the power consumption required to determine the focusing position is suppressed.

What is claimed is:

1. An image taking system comprising:
   an image taking means which takes an image of an object to be taken and generates image data,
   an objective body detecting means which detects at least a predetermined objective body from the image data,
   an exposure determining means which determines exposure for each of the detected objective bodies,
   a focusing position determining means which determines a focusing position for each of the detected objective bodies, and
   an image taking control means which causes the image taking means to take an image of each objective body according to the exposure and the focusing position determined for each of the detected objective bodies and stores image data of each objective body generated by the relevant image taking in a storage means in response to one image-taking action,
   wherein the storage means is for temporarily storing the image data, and comprises a display means which displays an image representing the image data temporarily stored in the storage means, an input means which inputs whether the displayed image is to be stored, and a storage means which stores only image data corresponding to the displayed image which is input as to be stored, and
   wherein the display means displays multiple images stored in the storage means temporarily, and an image not to be further stored as indicated by the input means is automatically deleted from the storage means.

2. An image taking system as defined in claim 1 in which when there are detected a plurality of predetermined objective bodies, the focusing position determining means calculates a focusing evaluation value for the range from a position nearer by a predetermined distance than the nearest predetermined objective body of the detected predetermined objective bodies to a position further by a predetermined distance than the furthest predetermined objective body of the detected predetermined objective bodies and determines the focusing position for each objective body.

3. An image taking system as defined in claim 1 in which the objective body is the face or an eye of a human.

4. An image taking system as defined in claim 2 in which the objective body is the face or an eye of a human.

5. An image taking method comprising the steps of taking a an image of an object to be taken, thereby generating image data, detecting a predetermined objective body from the image data, determining exposure for each of the detected objective bodies, determining a focusing position for each of the detected objective bodies, causing the image taking means to take an image of each objective body according to the exposure and the focusing position determined for each of the detected objective bodies in response to one image taking action, and storing temporarily the images taken by the image taking means in a storage means, wherein the storage means is for temporarily storing the image data, and comprises a display means which displays an image representing the image data temporarily stored in the storage means, an input means which inputs whether the displayed image is to be stored, and a storage means which stores only image data corresponding to the displayed image which is input as to be stored, and wherein the display means displays multiple images stored in the storage means temporarily, and an image not to be further stored as indicated by the input means is automatically deleted from the storage means.

6. An image taking system as defined in claim 1, wherein the display image to be stored is marked for storage.

7. An image taking system as defined in claim 1, wherein the display image to be stored is stored in an external storage means.

* * * * *